United States Patent [19]

Dubno et al.

[11] Patent Number: 4,722,053

[45] Date of Patent: Jan. 26, 1988

[54] FOOD SERVICE ORDERING TERMINAL WITH VIDEO GAME CAPABILITY

[76] Inventors: Michael Dubno, 5938 Liebig Ave., Riverdale, N.Y. 10471; Daniel Dubno, 261 W. 11th St., New York, N.Y. 10014

[21] Appl. No.: 454,152

[22] Filed: Dec. 29, 1982

[51] Int. Cl.$^4$ ............... G06F 15/24; G06F 15/44; A63F 9/22

[52] U.S. Cl. ................................. 364/401; 364/410

[58] Field of Search ............ 364/401, 410; 273/85 G, 273/DIG. 28

[56] References Cited

U.S. PATENT DOCUMENTS

| | | | |
|---|---|---|---|
| 3,588,838 | 6/1971 | Felcheck | 364/900 |
| 4,128,757 | 12/1978 | Garner, Jr. | 235/383 |
| 4,133,530 | 1/1979 | Takaichi et al. | 273/DIG. 28 X |
| 4,222,111 | 9/1980 | Sloan et al. | 364/900 |
| 4,247,106 | 1/1981 | Jeffers et al. | 364/410 X |
| 4,286,323 | 8/1981 | Meday | 364/411 |
| 4,300,040 | 11/1981 | Gould et al. | 235/381 |
| 4,302,010 | 11/1981 | Kaenel | 364/411 X |
| 4,335,809 | 6/1982 | Wain | 273/DIG. 28 X |
| 4,388,689 | 6/1983 | Hayman et al. | 364/401 |
| 4,415,065 | 11/1983 | Sandstedt | 364/401 X |
| 4,420,234 | 12/1983 | Doleisi et al. | 353/122 |
| 4,449,186 | 5/1984 | Kelly et al. | 364/407 |
| 4,485,398 | 11/1984 | Chapin, Jr. et al. | 358/50 |
| 4,547,851 | 10/1985 | Kurland | 364/401 |

FOREIGN PATENT DOCUMENTS 2105075  3/1983  United Kingdom .

*Primary Examiner*—Jerry Smith
*Assistant Examiner*—Clark A. Jablon
*Attorney, Agent, or Firm*—Karl F. Ross; Herbert Dubno

[57] ABSTRACT

A computer operated food servcie establishment has individual patron locations each provided with a game-playing terminal from which patrons can select games to be played from a listing thereof provided by the central computer unit. Each termainl also displays the food service items available and from the display, automatically, the patrons can select respective items and the selected items are displayed at a remote terminal, e.g. in the kitchen, to enable preparation of the food service items while game play continues at the terminals. Game play is automatically terminated upon the lapse of a selected time period subsequent to food service.

6 Claims, 3 Drawing Figures

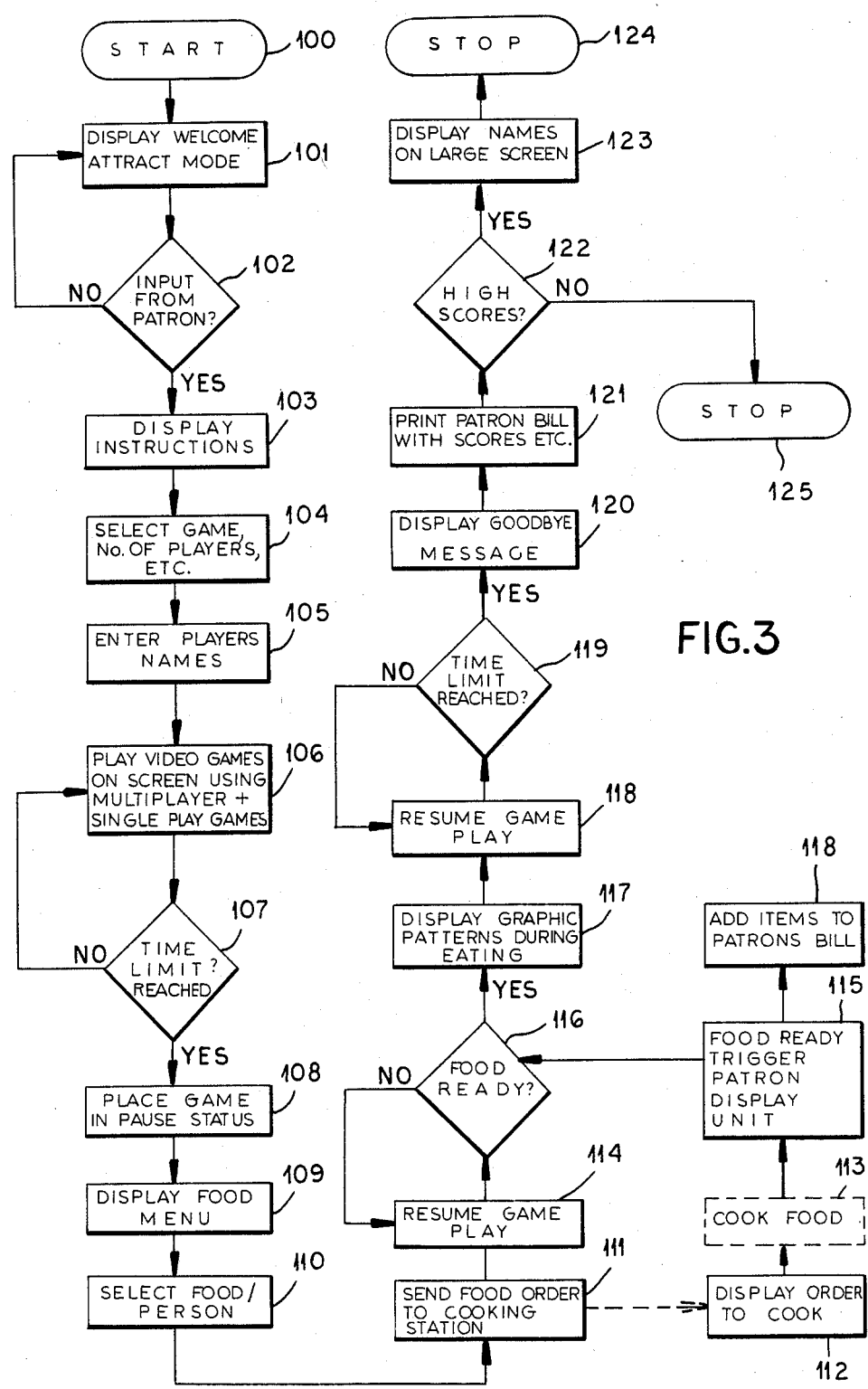

FOOD SERVICE ORDERING TERMINAL WITH VIDEO GAME CAPABILITY

FIELD OF THE INVENTION

Our present invention relates to a computer-controlled food service establishment and, more particularly, to a method of operating a computer system and to a food service establishment utilizing computer control.

The invention also relates to a process for preparing food service orders, to an entertainment medium associated with food service and a combination food-service and entertainment establishment.

BACKGROUND OF THE INVENTION

One of the major hallmarks of the last few years has been the establishment of the electronic game industry in a variety of forms, making available apparatus and techniques which have created new vistas in entertainment. For example, the advent of the microprocessor permitted so-called computer games to be produced in cartridge, tape or disk form for playing upon special purpose machines and even general purpose microcomputers or the like.

Games have been developed for large computer installations as well and, with refinements in graphics technique, have proved to be fascinating for young and adult alike.

In fact, experts in the field have recognized that video games may prove to be an important factor in decreasing a latent hostility between the individual and the computer, which hostility appears to have been ingrained in mankind since the development of so-called "thinking" machines.

However, to a certain extent, computer games and machines have, in spite of their versatility, made little headway in the food service field or in entertainment associated with food service.

For example, orders at food service establishments are still customarily taken by waiters or waitresses, manually inscribed upon a suitable memorandum, such as a multileaf book, manually or orally transmitted to the cook or food-preparation personnel, and ultimately delivered by hand by the waiter to the table.

Entertainment in food service establishments may be live, e.g. as in nightclubs, or may be prerecorded as in discotheques and even in establishments catering to youth and keying, for example, on video displays, old motion pictures and the like.

Personal involvement of the customer in the entertainment operation and even in the food ordering interplay is at a minimum.

OBJECTS OF THE INVENTION

It is the principal object of the present invention to provide a food service establishment in which disadvantages of earlier food service establishments are obviated and whereby the patron may be more efficiently served and entertained than has hitherto been the case.

Another object of the invention is to provide a method of operating a computer system for similar ends.

Still a further object of this invention is to provide a method of controlling food service orders whereby disadvantages of earlier systems are obviated and an optimum involvement of a patron in food service activity and entertainment can be provided.

SUMMARY OF THE INVENTION

These objects and others which will become apparent hereinafter are attained, in accordance with the present invention, which provides a food service establishment basically having a plurality of food-service stations, e.g. separate tables, each of which is provided with at least a rudimentary computer facility including at least a video monitor and game-playing elements permitting two patrons at the station to engage in a competitive game or any individual at any station to play a solitary game.

According to a feature of the invention, the computer facility at each station is also connected to a central location provided with at least an output terminal at which selected menu items can be displayed or otherwise outputted and hence the order of the patrons presented to the cooking or food-preparation staff.

Advantageously, means is provided, after a predetermined period of games play, for interrupting the game in progress at a particular station at an appropriate point, e.g. after a certain number of points have been scored and/or a certain number of playing pieces have been destroyed, to provide an audio visual display welcoming the patrons to the facility and displaying the various menu items available at the time together with prices and the like. The particular menu items can then be selected, e.g. by operating a light pen, a joystick, selector buttons or other selector means.

According to a feature of the invention, the selected menu items can be stored, e.g. in the memory of a central computer facility connected to the various terminals, and tapped at the output station when, for example, monitoring personnel key in the number of the patron station.

The output station can be provided with a printer which can display the selected items and price, calculate the taxes, provide a subtotal and, if desired, provide a final total as well as printing out, if desired, special purpose forms, e.g. credit card charge forms, the latter being thereafter imprinted with impressions from the patron's card.

According to another feature of the invention, the computer may, if the order is given, restore a game mode to the computer facility at each patron station, thereby allowing the patrons to entertain themselves pending receipt of the food which can be delivered from the kitchen in the usual manner.

Once the food is delivered, the game mode can be terminated although, in some cases, the game mode can continue for a limited period, e.g. a half hour, after delivery of the food. At the end of this time, the computer facility at the patron station can provide an audio/visual display thanking the patron for his presence and inviting the patron, for example, to return and/or to move to an establishment adjacent the restaurant and provide it with standard coin-operated computer games.

The system of the invention has numerous advantages and ramifications. For example, it allows direct communication between the patron and the kitchen so that the patron is immediately apprised of the availability or unavailability of a particular selected item, it eliminates the possibility of error since a direct line of communication is established, it provides an automatic printout so that food items which should be charged are not overlooked, it guarantees a more accurate accounting, thereby avoiding irritating patrons, and, when the printed document also includes a record of the scores of the patron or patrons in various games, can also serve as a record and a remainder to the patron of the entertaining pastime associated with the particular meal.

From the point of view of the patron, moreover, the system of the invention has numerous advantages. Since the computer facility is a fixture at each patron's station, its use will tend to be more or less matter-of-fact and will serve to break down the invisible mental barrier between the individual and the machine. The system will occupy the time of an individual who might otherwise become irritated by delays in food service and will provide an introduction to a new personalized entertainment medium which for each patron station may be different from those of other patron stations. It is not necessary, therefore, for patrons to be subjected to the identical entertainment.

Of course, the video monitor can be provided with selector means, for example, for running brief short subjects in a video mode and may serve for nonparticipatory entertainment of the patron as well.

BRIEF DESCRIPTION OF THE DRAWING

The above and other objects, features and advantages of the present invention will become more readily apparent from the following description, reference being made to the accompanying drawing in which:

FIG. 3 is an information flow diagram for the apparatus of the invention.

SPECIFIC DESCRIPTION

Figure 1:
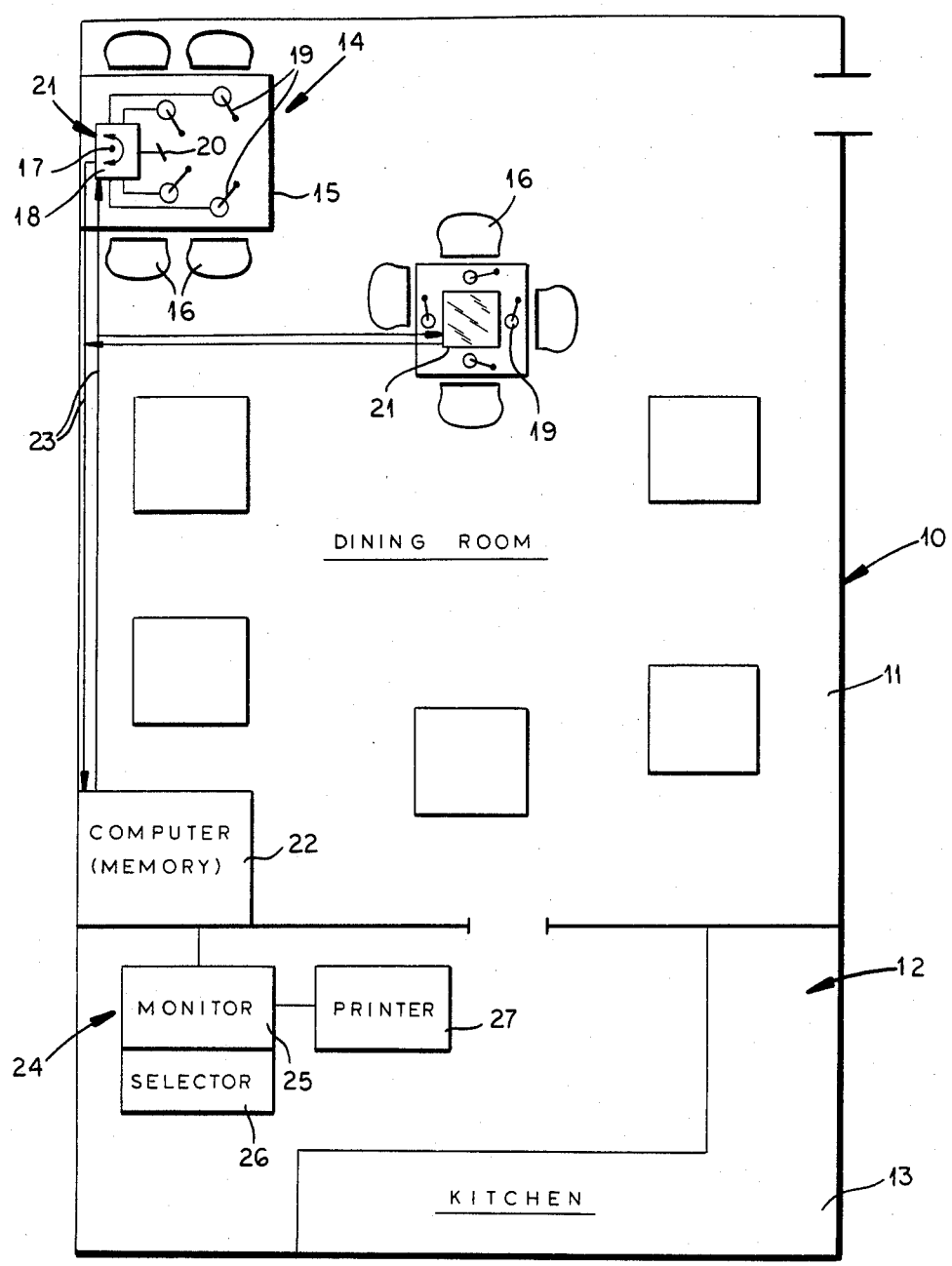
FIG. 1 is a diagrammatic plan view of an installation according to the present invention.

The installation shown in FIG. 1 comprises, in the simplified form illustrated, a restaurant 10 having a dining room 11 and a kitchen 12, the various appliances of the latter being represented diagrammatically at 13.

The dining room contains a number of patron stations 14, each of which can be constituted by a table 15 surrounded by a number of chairs 16.

On the wall or on the table, adapted to swivel about a vertical axis 17, is a video monitor 18 for each table.

The video monitor forms part of a respective computer facility at each of the tables and may be simply an output terminal for the computer and/or an independent microcomputer, can be provided with a keyboard, or can be free from a keyboard. The use of a keyboard facility at each patron station is desirable since it allows more versatile use of the station.

In the embodiments shown, however, the video monitor 18 is associated with four joysticks 19, each of which is adapted to be operated by a patron sitting in one of the chairs. In addition, a light pen 20 can be provided. The light pen 20, the joysticks and any keyboard or other means for interfacing the individual with the computer facility, e.g. a track ball, can be used to play games which are displayed upon the screen. These games may be games for each individual to test his skill and played one at a time with the scores of the patrons at each station being recorded, competitive games requiring two or more inputs or, indeed, any conventional video or electronic game currently available in any form, cartridge, tape, disk or the like.

Each of the computer facilities 21 at each patron station 14 can be connected to a central computer facility represented at 22 by suitable multiple conductor cables, the cables providing two-way information flow as shown by the lines 23.

The central computer 22 is also connected to an output station 24 which can be directly located in the kitchen or in an ante-chamber thereof and which comprises a monitor or other output terminal 25 having a keyboard 26 forming a selector and communication facility, and a printer 27.

Figure 2:
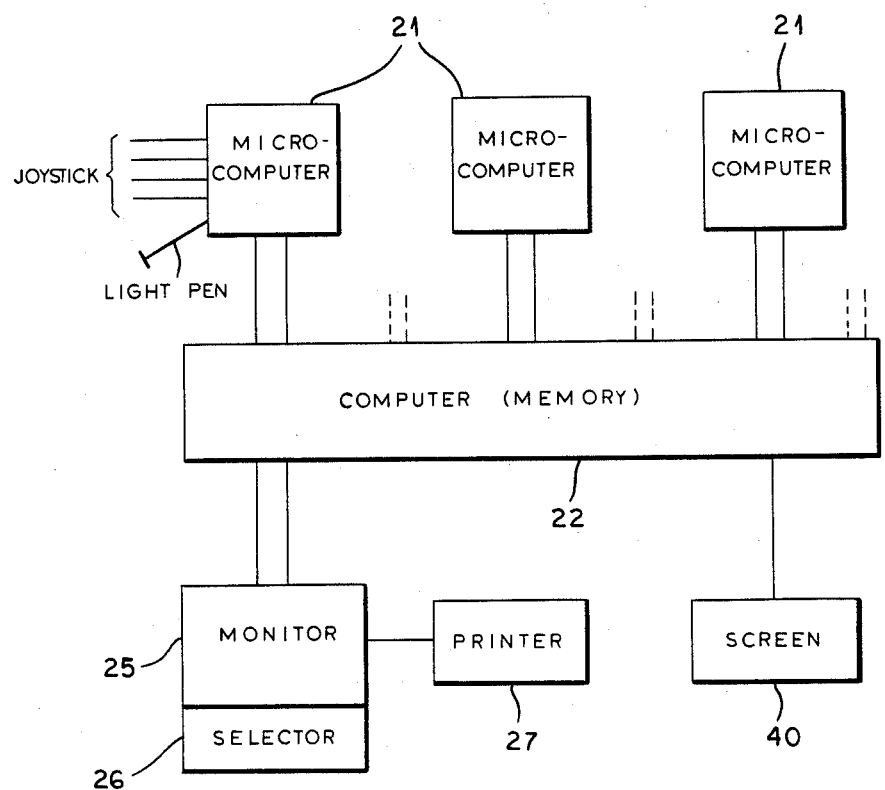
FIG. 2 is a diagram of the computer installation.

As can be seen from FIG. 2, a number of the microprocessor-controlled computer facilities 21 can be connected to the computer 22 which contains the usual memory.

As will be apparent from the information flow diagram of FIG. 3, numerous modes of operation are possible in accordance with the invention.

Let us assume, for the basic mode of operation, that a group of patrons have been seated at a particular patron station 14 by the maitre d' and are not prepared to order at that precise moment, i.e. they are awaiting a colleague, friend or other party.

The maitre d' turns on the video monitor which automatically, in response to the turn-on signal, triggers the computer 22 to transmit a game menu to the terminal.

The patrons, utilizing the light pen 20, one of the joysticks 19 which can move a cursor, or the keyboard of the computer facility, select the first game to be played. Let us assume that this game is an individual game of skill acquiring points until the player is defeated somehow.

The first player plays the game, accumulates his points and indicates, by his selector, his name associated with these points. The machine resets and the other patrons play. Competition is continued in this manner until, at a predetermined time after the monitor has been turned on, e.g. fifteen minutes, at the end of one part of the game and before the beginning of the next, the game mode is interrupted and the computer 22 transmits to the patron station, a menu which may be printed and graphically displayed, with drawings or like video augmentation. An acoustic description of the menu may also be provided. The menu may be complete with prices and instructions to the patron that, after the menu has run through a third time, the patrons may select their respective dishes by the use of a light pen or touch screen.

By manipulating the light pen, therefore, the patrons may select the respective dishes which are registered in the memory of the computer 22.

In appropriate order, the kitchen personnel, operating the selector keyboard 26, tap the memory and print out the selected dishes and prices. The computer can also, of course, signal the printer to total the charges, add any surcharge and apply any taxes.

The total amount can be retained in the computer as a subtotal, should the patrons order further, adding the additional items to the previously subtotaled amount, applying the requisite tax and retotaling the bill.

The printer may, in addition, simultaneously print out the total on a prepared credit card slip so that the waiter or other individual need merely run the patron's credit card and the slip through a conventional imprinter.

Based upon the displayed order, the kitchen staff, of course, can then prepare the dishes and send the dishes to the assigned table by a waiter or, if desired, a robot which can be programmed to deliver the food to the table and then return to the kitchen. Such robot conveyors are of the track or trackless type and have been used in hospitals and the like for some time.

Naturally, while the patrons are waiting for receipt of the ordered food, the game mode is restored to the machine at their station and they can engage in a full spectrum of game play. If desired, the scores for the various games can be recorded in the memory and printed out on the bill when the latter is finally totaled.

Once the food is delivered, utilizing the selector in the kitchen, the patrons can be thanked for their patronage, invited to return and/or invited by audio/visual display to proceed to an adjacent facility provided with arcade-like video games.

Of course it is also possible to provide for a certain postprandial entertainment period in which the video game mode is permitted to continue for a certain time.

The restaurant may be provided with a screen 40 which can be connected to the computer 22 to display the name of a high scorer for a selected period in any of the number of games and, of course, the operator of the establishment may wish to award prizes or other benefits to such high scorers as an inducement for them to enter and partake of the entertainment and repast.

Of course, the system is not limited to entertainment in combination with food service, but can include the combination of food service with educational techniques. For example, instead of games of enjoyment or skill, games designed to improve the sales techniques, language capabilities or capacities or even general knowledge may be provided.

For example, in teaching a language, the association of items of food and food service elements can be related to foreign language enunciations from the audio facility provided at the patron terminal and at the same time the patron terminal may predisplay the foreign language word for the food item.

In FIG. 3 we have presented a flow chart in which the rhomboids represent patron input, the rounded polygons output to the patron through the use of sound, graphics or speech synthesis, and the broken lines, human intervention in the sequence of operations.

The input from the patron can be from a keyboard, joystick, touch screen, light pen or any equivalent input device.

After the system has been placed in a start mode 100, the computer facility at the patron station displays a welcome by preprogrammed graphics and can enunciate such welcome utilizing the audio facility. This is referred to as the welcome attract mode 101.

In the event no input from a patron is sensed at 102, the welcome attract mode is repeated since the patrons obviously are not suitably settled at the table to permit them to engage fully in the interaction with the system.

If input from a patron is detected, the computer facility at the patron station displays the instructions in the form of a game menu and describes the events to follow, i.e. the fact that a food menu will be presented in short order and the game play interrupted for the purpose of selecting from the menu. After instruction display at 103 a particular game can be selected with a number of players and other items of choice common with video games and computer games.

In addition, the players' names can be entered at 105 and the game play proceeds on the particular patron screen using multi-player and single-play games as represented at 106.

The duration of play is compared with elapsed time to determine at 107 whether the game play time limit has been reached. If not, game play can continue. If the time limit has been reached, upon the conclusion of the particular game in progress or portion of the game in progress, i.e. when a player has completed his turn, the game is placed in pause status as represented at 108 and the food menu is displayed as shown at 109.

Utilizing the selector available to him, e.g. the joysticks, each player can then select the food which can be identified to the particular individual as represented at 110.

The food order is transmitted to the cooking station or kitchen at 111 and is displayed to the cook at 112 who prepares the food (step 113) in the usual manner.

Once the order is sent, however, game plays resumed at 114 and the computer now monitors the input at 115 controlled by the cooking facility to determine whether, at 116, the food is ready. If not, game play can continue. If the food is ready, of course, game mode is terminated and the computer facility at the patron station can display at 117 graphic patterns to provide a calm environment conducive to eating. These graphic patterns may be accompanied by appropriate music.

Within the kitchen, items may be added at 118 to the patron's bill, the data for which have previously been stored.

After an appropriate period for eating, game play is resumed at 118 for a predetermined period which is monitored at 119. If the time limit is not reached, game play continues. However, should the time limit be reached, the computer facility at the patron station displays at 120 a farewell message which invites the patrons to return and suggests that they might, if desired, continue game play at an arcade facility in the vicinity.

The patron bill with scores etc. is printed as representated at 121 and the high scores for the respective games are evaluated at 122 for all of the patrons and, should a high score be detected at 122, it is displayed together with the name of the individual on the large screen 40 as represented at 123. The program then concludes at 124. If the patron has not gained a high score for the day, week, etc., the program stops at 125.

We claim:
1. A food service installation comprising:
   a plurality of patron stations, each comprising a dining table and seating means at said table for accommodating a plurality of patrons;
   a computer facility at each of said stations, each computer facility comprising at least one video display terminal, and a plurality of game-playing implements adapted to enable patrons at said station to play a game displayed on said terminal;
   means connected to said terminals for displaying thereon food service items adapted to be selected by the patrons;
   a further terminal operatively connected to the terminals at said station for displaying food service items selected by the patrons at the respective stations to enable the preparation of said food items;
   means connected to said terminals at said stations for permitting the playing of selected games at each terminal before and after the display of food service items at least for a limited time;
   a central computer connected to said terminals and feeding information to and receiving information from said terminals, said central computer being programmed to terminate games played at the terminals of said station upon the lapse of a selected time period subsequent to food service, each of said stations being provided with a plurality of joysticks connected to the respective terminals for enabling the playing of the game thereon, said joysticks being connected to the respective terminals to enable the selection of games from a game menu and food service items from a food service menu displayed on the respective terminals by the respective joysticks;

a printer connected to said further terminal for printing out a patron's bill, said printer being connected to print-out indicia relating to the games played by the respective patrons on the respective bills; and a central display common to all of said stations and means for activating said display upon the attainment of a high score in a game by one of said patrons.

2. A food service installation comprising:

a plurality of patron stations, each comprising a dining table and seating means at said table for accommodating a plurality of patrons;

a computer facility at each of said stations, each computer facility comprising at least one video display terminal, and a plurality of game-playing implements adapted to enable patrons at said station to play a game displayed on said terminal;

means connected to said terminals for displaying thereon food service items adapted to be selected by the patrons;

a further terminal operatively connected to the terminals at said station for displaying food service items selected by the patrons at the respective stations to enable the preparation of said food items;

means connected to said terminals at said stations for permitting the playing of selected games at each terminal before and after the display of food service items at least for a limited time; and a central computer connected to said terminals and feeding information to and receiving information from said terminals, said central computer being programmed to terminate games played at the terminals of said station upon the lapse of a selected time period subsequent to food service, the terminal at each station being constructed and arranged to respond to touch screen selection of food service items displayed on the terminal.

3. A method of operating a computer system which comprises the steps of:
 (a) providing a plurality of patron stations, each equipped with a food-service table and seating means for a plurality of patrons with respective game-playing terminals of the computer system;
 (b) displaying on each of said terminals upon the seating of the patrons at a respective station, a listing of games provided for play at each terminal whereby the patrons utilizing implements connected to the respective terminal can participate in the game play;
 (c) after a predetermined game-play period, displaying at each terminal a menu of food service items available for supply to the patrons whereby said patrons may select food service items from said menu;
 (d) permitting each terminal to operate in a game mode during the preparation of the food service items;
 (e) terminating operation of the game mode at each terminal at a predetermined time after the service of the prepared food service items to the respective station;
 (f) comparing scores attained in game play by patrons at each station with previous high scores for the respective game;
 (g) displaying each new score over a predetermined period of time on a central display visible to the patrons at all of said stations;
 (h) printing out indicia representing the selected food service items together with the parties thereof, automatically totaling the bill and printing out the total for printed bills at least for each station;
 (i) interrupting the game mode during the food eating period following food service; and
 (j) printing out indicia relating to the games played by the respective patrons at the respective terminals on a respective bill.

4. The method defined in claim 3, further comprising the step of providing an audio visual welcoming display on each terminal prior to the initiation of a game mode.

5. The method defined in claim 3, further comprising the step of providing an audio visual farewell display at each terminal upon the termination of the game mode.

6. The method defined in claim 3, further comprising the step of providing an audio visual display on each terminal during the respective food eating.

* * * * *